March 8, 1960     E. C. GREANIAS     2,928,073

DATA SENSING AND HANDLING APPARATUS

Filed Dec. 31, 1954     4 Sheets-Sheet 1

INVENTOR.
EVON C. GREANIAS

BY
Dewey J. Cunningham
ATTORNEY

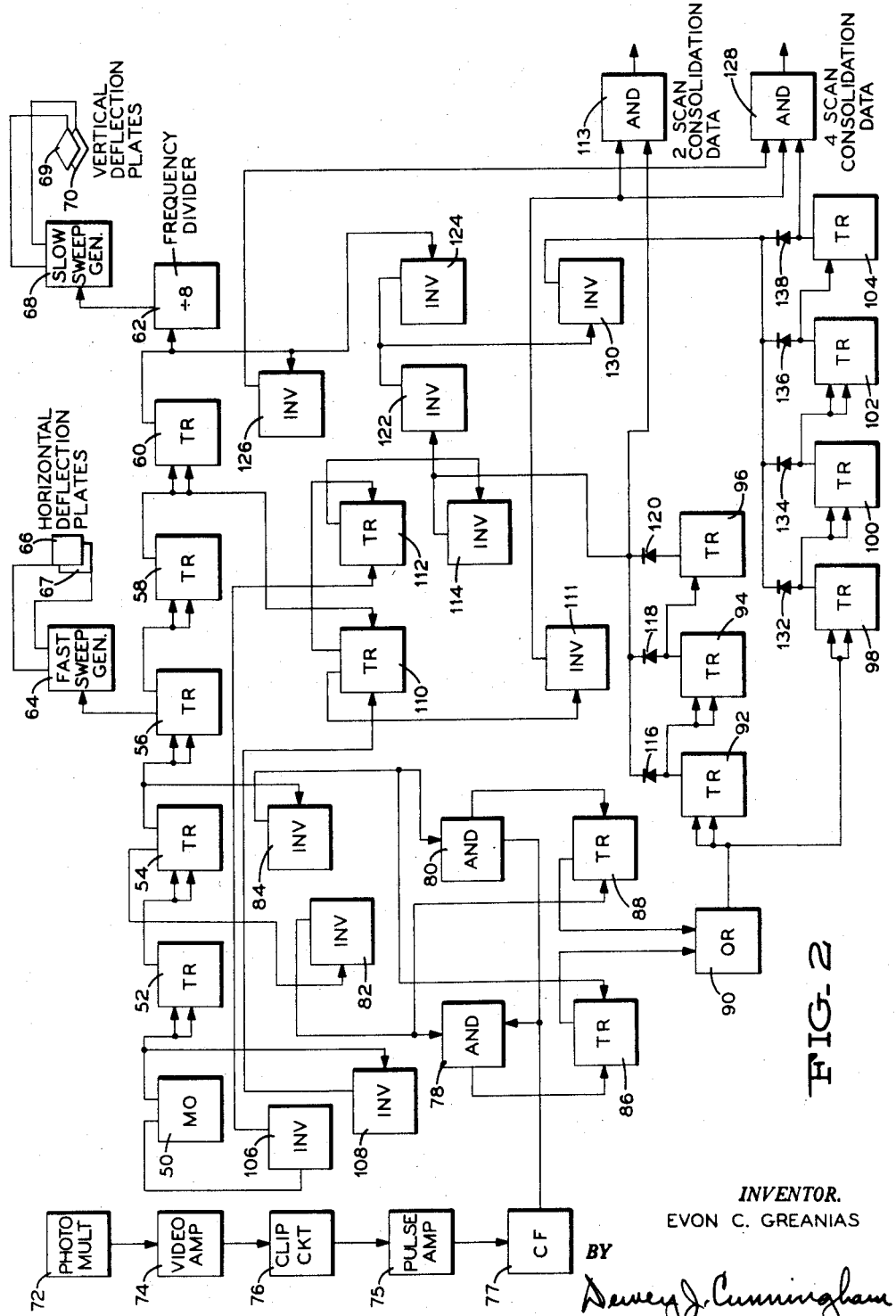

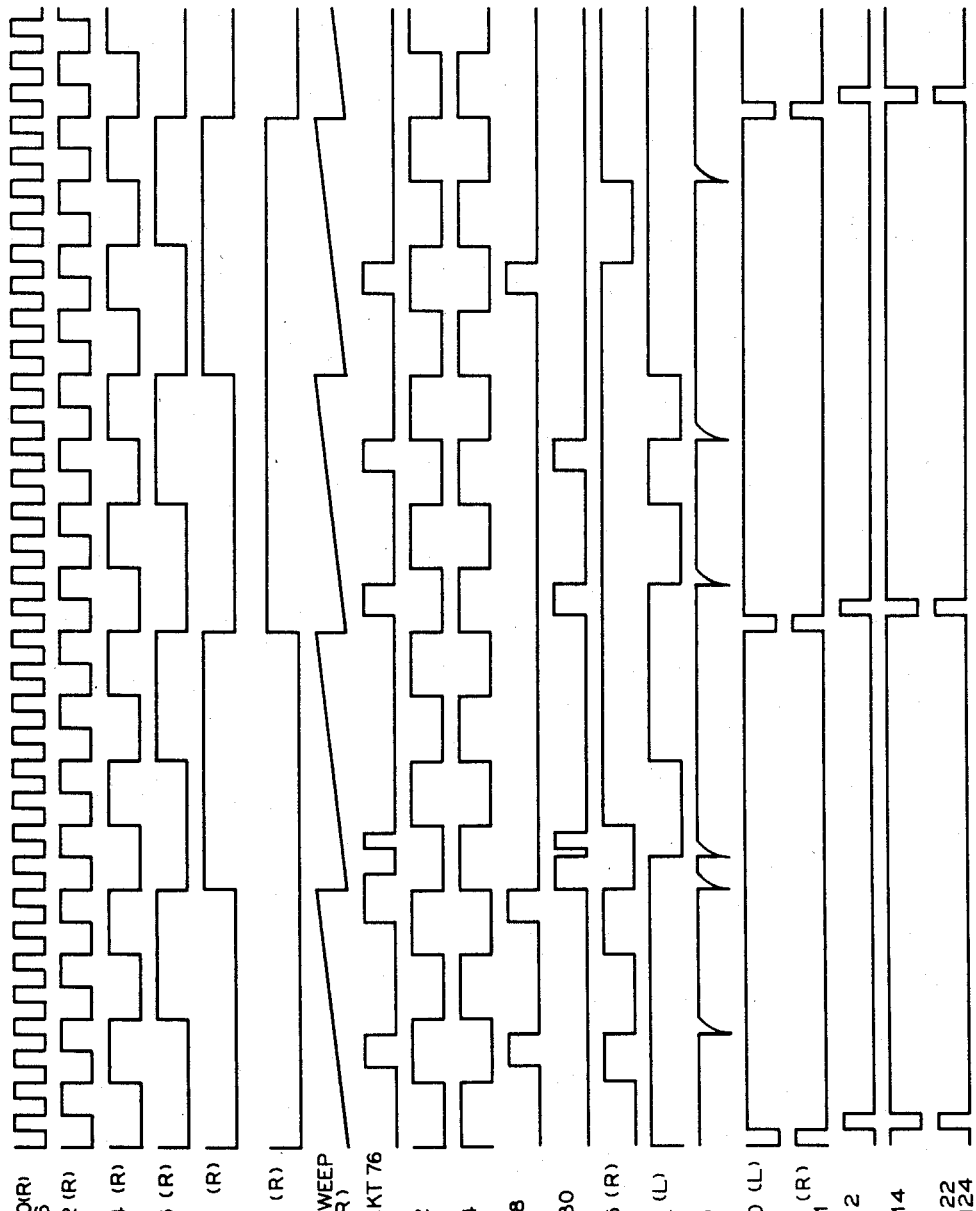

March 8, 1960  E. C. GREANIAS  2,928,073
DATA SENSING AND HANDLING APPARATUS
Filed Dec. 31, 1954  4 Sheets-Sheet 4
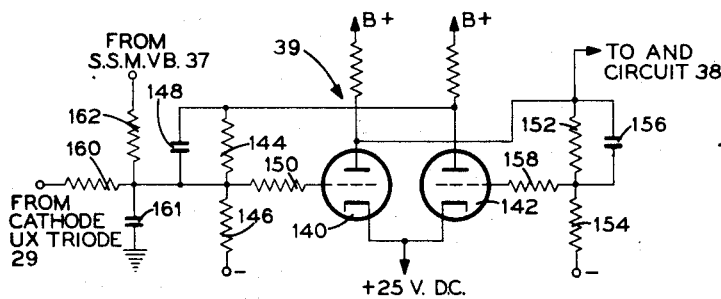
FIG_4
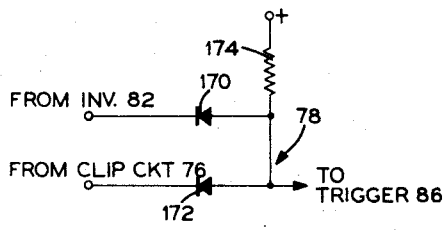
FIG_5
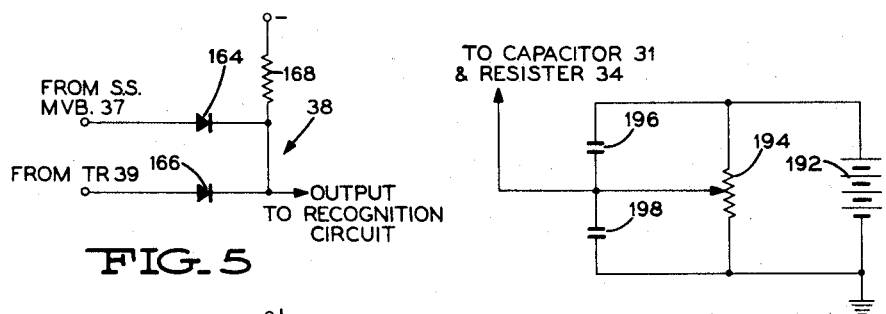
FIG_9
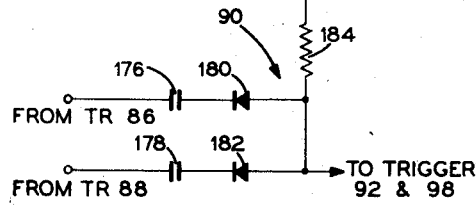
FIG_6
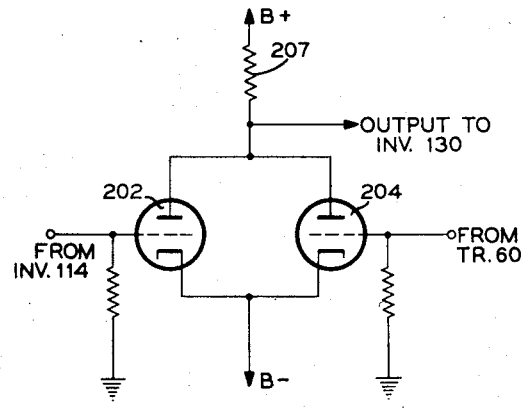
FIG_10
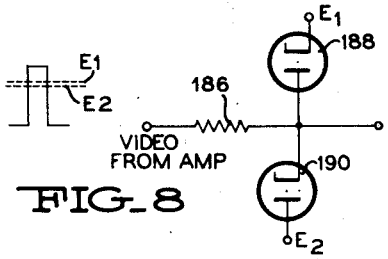
FIG_7
FIG_8
*INVENTOR.*
EVON C. GREANIAS
BY
Dewey J. Cunningham
*ATTORNEY*

United States Patent Office 2,928,073
Patented Mar. 8, 1960

2,928,073

DATA SENSING AND HANDLING APPARATUS

Evon C. Greanias, Vestal, N.Y., assignor to International Business Machines Corporation, New York, N.Y., a corporation of New York Application December 31, 1954, Serial No. 479,110

9 Claims. (Cl. 340—149)

This invention relates to a data handling circuit for use in conjunction with scanning apparatus, and particularly to such a circuit which consolidates data obtained from a scanning apparatus for use by the recognition unit of a complete character sensing system.

At the present time many different forms of scanning apparatus are used in character sensing systems. For example, perforated discs rotated at high speeds are used to cause a spot of light from a light source to trace successive paths across characters to be scanned. The variations in reflected light from the characters and the background upon which they are printed are viewed by a photomultiplier. The output signals from the photomultiplier are of varying amplitudes, depending on the amount of light received by the photomultiplier. Starting with a light background intensity which causes a particular level of voltage as the output from the photomultiplier, the sensing of portions of the characters causes the voltage to rise to an amplitude which is dependent on the contrast between the portion sensed and the background. It will be seen that the amount of reflected light viewed by the photomultiplier at any particular instant depends largely on the reflectance characteristic of the area under scan. The term reflectance characteristic is meant to include all factors which affect the amount of reflected light which the photomultiplier views where the light source intensity and scanning spot diameter are maintained constant. These factors include the shade or color of the area, i.e., black, blue, gray, etc., and the surface character, i.e., glossy, dull, flat, etc. If the reflectance characteristic of an area covered by the scanning spot is not uniform, then the intensity of the light reflected will be the average of the intensities reflected from the different incremental areas making up the spot area.

The limit at which photomultiplier signals may be detected is determined by the signal to noise or background ratio. These signals may be defined as the change in photomultiplier current experienced in passing from the background to the character. For weak character lines this is quite low. It has been found that larger percentage changes in photomultiplier current occur when a small diameter scanning spot is used, i.e., in the order of .0005 inch to .002 inch, than when a large diameter spot is used, i.e., in the order of .005 inch and above. This apparently results because weak character lines actually consist of black ink deposited in small scattered areas and the small diameter spot covers only the small areas whereas the large spot includes several of the lighter areas between the small areas.

It has not heretofore been feasible to utilize a small diameter spot as described above for a number of reasons. First and foremost, the use of such a scanning spot would increase the size of the equipment many times since it would provide much more data to be processed. Second, while it would provide more detailed data, it very possibly would provide data which would be misleading for certain recognition criteria since there might be the indication of a light area in portions of a character where none should be. The sensing of characters which may be considered marginal have a large number of such light areas. Since the design of any complete character sensing apparatus must be one which can reliably operate on almost any form of character which is recognizable to the average person, various degrees of degraded characters must be recognized. The present invention is devoted to this end.

According to the present invention a small diameter scanning spot of the order previously described is adapted to be used in scanning characters on a record medium. Signals furnished at times when the spot is sensing portions of the character are fed to a data consolidation circuit which includes accumulating means. The operation of this circuit is such that the data obtained over a period of time as the spot inspects a predetermined number of incremental areas must have indicated the face that portions of the character were sensed for a predetermined percentage of said period of time before a decision will be made that the entire area scanned during this period of time is to be considered black, i.e., as a part of the character. This is accomplished by scanning the character with a succession of short sweeps. The data gathered by the photomultiplier during a predetermined number of these sweeps is amplified and clipped at upper and lower levels to provide significant data to an accumulator means which can remember what percentage of the time the presence of a portion of a character existed during said predetermined number of scans. At the completion of said predetermined number of sweeps the last-named means is interrogated to see if the percentage is sufficient to allow the entire area scanned by said predetermined number of sweeps to be considered as a part of the character. The number of scans as well as the signals indicating a portion of the character are matters which may vary from one set of conditions to another. Thus, it is possible to look at the data extremely close and yet simplify the recognition circuitry to a marked degree.

An object of the present invention is to provide an improved data handling circuit.

Another object of the invention is to furnish an improved data processing circuit which receives extremely detailed information relative to minute areas of a character being scanned and provides a data output which relates to much larger areas of the character.

A further object of the present invention is to provide a circuit for modifying data received from a character scanning apparatus to provide simpler and more reliable data relative to the character.

A still further object of the present invention is to provide meaningful data relative to characters having weak lines which fall within the marginal area of recognition.

Another object of this invention is to provide a data handling circuit for supplying data to a conventional recognition unit of a character sensing system from data obtained by scanning characters at a very fine scanning resolution.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 shows a schematic diagram of a second embodiment of the present invention;

Fig. 3 shows a number of output waveforms for a number of the components shown in Fig. 2; and Figs. 4 through 10 are schematic diagrams of conventional circuits which may be used in the embodiment of Fig. 1 or Fig. 2.

Similar reference numerals throughout the several views represent similar parts.

Figure 1:
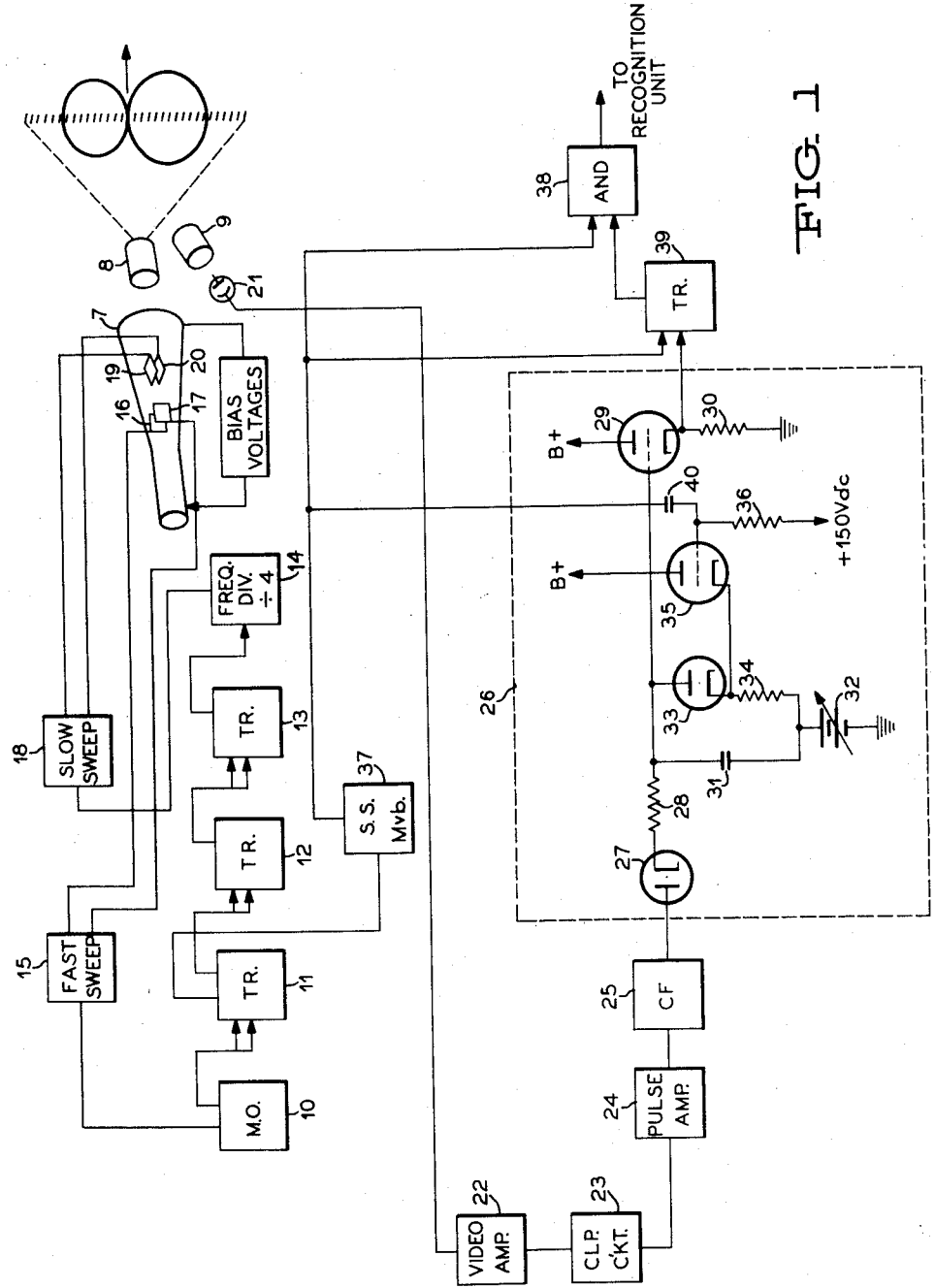
Fig. 1 shows a schematic diagram of a first embodiment of the invention scanning the digit "8" by way of example, and the manner in which a frame of scan may progress across the character.

Referring specifically to Fig. 1, the digit "8" is shown. A plurality of very short horizontally extending sweeps move down across the character, each successive sweep being spaced vertically from a prior sweep. A predetermined number of these sweeps form a frame of scan across the character. The arrangement may be such that the character moves relative to the scanning pattern such that a number of frames of scan will take place across the character so that each successive frame covers a portion of the character immediately adjacent the portion scanned on the last frame. It will be understood that the small scanning spot diameter may vary considerably. However, by way of example, the diameter may be on the order of .001 inch. Each horizontal line of scan may be approximately .010 inch long and be spaced apart approximately .005 inch vertically so that a column .160 inch high would consist of thirty-two lines. Horizontal movement of the column relative to the character would be .010 inch per column so that corresponding lines in successive columns would scan adjacent areas on the character and a .100 inch character would be covered by ten columns. The term character as used in this application means the generally accepted form or shape of some arbitrary or conventional device that is used in writing and in printing.

In the first embodiment of the invention, a timing circuit is shown to include a master oscillator 10, triggers 11, 12 and 13, and a frequency dividing circuit 14. The master oscillator may take many forms. By way of example only, it may be a conventional free-running multivibrator. The output from the right side thereof is a series of negative pulses. Triggers 11, 12 and 13 are conventional and may be of the common Eccles-Jordan type. The trigger comprises two triodes, referred to as right and left, interconnected such that only one triode can conduct to a substantial extent at one time. When one triode goes toward cut-off, the other triode begins conducting. The control grids of each triode are commoned and arranged to receive negative pulses as an input. The trigger is considered to be "on" when the left triode conducts and "off" when the right triode conducts. The receipt of a negative pulse causes the trigger to change condition regardless of its present condition.

The negative pulses from master oscillator 10 are fed to the control grids of trigger 11. The plate output of the right triode of trigger 11 connects to both control grids of the right and left triodes of trigger 12. The plate output of the right triode of trigger 12 connects to both control grids of the right and left triodes of trigger 13. The plate output of the right triode of trigger 13 is connected to a frequency dividing circuit 14. The last-named circuit is of conventional design. It may be in the form of a blocking oscillator which is triggered by the first of a series of four pulses. The time constant of the blocking oscillator is such that the second and third pulses do not affect the blocking oscillator but the fourth pulse provides a positive output pulse. The circuit 14 may also be in the form of a phantastron which can also be made to divide by four. Also, two additional triggers may be furnished in lieu of the circuit described. The entire timing circuit may take many different forms and are in fact used in many different electronic apparatus such as radar, computers, etc.

The output of the left side of the master oscillator 10 is a series of positive pulses which bear a complementary relation to the negative pulses from the right side. The positive pulses are connected to a conventional sawtooth sweep generator 15 such as is found in cathode ray tube oscilloscopes. The time constant of sweep generator 15 is such that when the output is connected to horizontal deflection plates 16 and 17, a single sweep occurs in a horizontal direction for each positive going pulse received from master oscillator 10.

The plate output of the left side of the frequency dividing circuit 14 is in the form of a series of positive pulses, there being one positive pulse for every thirty-two positive pulses from master oscillator 10. The positive pulses from circuit 14 are connected to a conventional sawtooth sweep generator 18. The time constant in this generator is such that a single sawtooth voltage is generated for thirty-two sawtooth voltages from sweep generator 15. The sawtooth voltage from generator 18 is connected to the vertical deflection plates 19 and 20, and causes the successive vertical spacing of the short horizontal scans.

The horizontal and vertical deflection plates are shown schematically, but it will be understood that they form a part of a cathode ray tube apparatus 7 commonly referred to as a flying spot scanner. The arrangement is such that as characters on a record are moved past the scanner and its associated lens system 8 and through the scanning pattern shown, the reflected light from the record is adapted to be picked up through suitable lens system 9 by a photomultiplier 21. The photomultiplier has a certain negative voltage level when viewing the light reflected from the record background. When portions of a character are sensed, the voltage rises for the duration thereof so as to provide positive output pulses.

The photomultiplier pulses are amplified in a conventional video amplifier 22 and fed to a clipping circuit 23 which has upper and lower clipping levels. The spacing between the upper and lower clipping levels is small. The arrangement is such that only those signals which rise in amplitude above the lower clipping level are allowed to pass through the circuit. The upper clipping level is provided so that all of the output pulses from the circuit will have a substantially constant amplitude. In other words, the top of the signal appearing above the upper clipping level is cut off. The constant amplitude signals from clipping circuit 23 are of variable duration, the duration being dependent upon the time the input signals to clipping circuit 23 exceed the lower clipping level. These pulses are connected to a conventional pulse amplifier 24 where the pulses are amplified and connected through a conventional cathode follower 25 to a consolidation circuit illustrated generally by reference numeral 26.

The consolidation circuit serves as an accumulating means and comprises a diode 27 whose plate is connected to receive the output from cathode follower 25. The cathode of the diode is connected through a resistor 28 to the control grid of a triode 29. The plate of the triode is connected to the positive terminal B+ of a suitable source of direct current, not shown, the negative terminal of which is grounded. The cathode is connected to ground potential through a resistor 30. The arrangement is such that triode 29 operates as a standard cathode follower. That is, the cathode potential follows the grid input potential.

The grid triode 29 is connected through a capacitor 31 to the positive terminal of a variable voltage source 32 which is schematically illustrated as a battery. The negative terminal of this source is connected to ground. A series connected diode 33 and resistor 34 are connected in parallel across capacitor 31, the plate of the diode being connected to the grid of triode 29 and the cathode of the diode being connected to one end of the resistor 34. The cathode of diode 33 is connected directly to the cathode of a triode 35. The plate of this triode is connected to B+ and the grid is connected through a resistor to a lower positive D.C. power source, illustrated herein as being +50 v. D.C. Triode 35 normally conducts due to the 50 v. D.C. bias voltage so that the cathode of diode 33 is normally at a potential higher than the grid potential of triode 29. This causes diode 33 to have a normally non-conducting condition.

As the clipped video pulses from cathode follower 25 pass through diode 27, they charge capacitor 31 to a potential which is determined by the duration of the pulses during a predetermined time interval. As previously mentioned, diode 33 does not normally conduct so that the charge normally remains on the capacitor. The potential appearing on the grid of triode 29 therefore becomes substantially equal to the voltage of battery 32 plus the voltage across the capacitor. The cathode of triode 29 follows the grid voltage. That is, as the grid voltage rises, the triode conducts more heavily and the cathode rises accordingly.

In order to determine the number of scans which will be considered for a consolidation period, appropriate connections may be made to points in the timing circuit for obtaining control pulses at the frequency desired. In the present example, consolidation is made on a two scan basis. That is, the video data is allowed to accumulate in the data consolidation circuit 26 for two scans and the condition at the end of the two scans is returned to normal. The condition, however, which has been produced before the end of the second scan is interrogated to determine if the area scanned on the two scans is to be considered as black, i.e., the proper degree of presence of a portion of a character, or white, i.e., too much presence of background to be considered a part of the character. The left side of trigger 11 provides a series of output pulses having a frequency which is equal to one-half the master oscillator frequency. From a particular starting point, at the end of the second horizontal sweep a positive going potential is obtained from the left side of trigger 11, this potential being connected to a single-shot multivibrator 37. This multivibrator is of conventional design. It is also commonly referred to as a one-shot multivibrator. It has the characteristic such that it provides a negative going output potential on the left triode plate in approximate coincidence with the positive going input potential. A brief time interval later, however, the output potential from the single-shot multivibrator rises so as to provide a positive going potential. Thus, a negative pulse is provided for reset and reading purposes. The duration of said brief time interval may vary depending on the time constant chosen within the single-shot multivibrator. In any event it is less than the period between the positive going input pulses to the multivibrator.

The output potential from multivibrator 37 is supplied to a negative "and" circuit 38, trigger 39 and through capacitor 40 to the control grid of triode 35. The cathode of triode 29 is connected to the left triode of trigger 39. This trigger is not capacitatively coupled to the said cathode. The right side is normally conducting so that at this time the trigger is "off." The trigger will not turn "on" until the potential from the cathode of triode 29 rises above a predetermined threshold level. Thus, trigger 39 is a threshold responsive device. The plate of the left side is connected to "and" circuit 38 so that when the trigger is turned "on" a relatively negative potential is supplied to the "and" circuit.

The negative "and" circuit 38 is of the conventional coincidence type with the arrangement being such that an output signal is provided therefrom, if the read pulse having the negative going leading edge from single-shot multivibrator 37 and the negative potential from trigger 39 occur in coincidence. In other words, if trigger 39 is "on" when the read pulse occurs, an output signal is provided. The duration of the output signal is equal to the length of time during which the inputs are in coincidence.

The leading edge of the read pulse is also used to reset the trigger to its "off" condition. However, since some time is required by the pulse in order to turn the trigger "off," there is still sufficient time to read the condition of the trigger through the "and" circuit. In addition, the read pulse is used to cut triode 35 off for a sufficient time to allow capacitor 31 to discharge through diode 33 and resistor 34.

The operation of the device will now be described. Master oscillator 10, triggers 11, 12 and 13, and the frequency dividing multivibrator 14 are used to generate a plurality of timing pulses for controlling the scanning operation as well as the read and reset operations. Video data viewed by the photomultiplier is amplified and fed to a clipping circuit where all of the signals which arise above a predetermined lower level provide an output pulse. These pulses are maintained at a substantially constant amplitude by clipping the peaks off the pulses which rise above a predetermined upper level. The pulses from the clipping circuit are amplified and fed through a cathode follower to a data consolidation circuit. In this circuit the pulses are used to charge a capacitor 31 over a period of two scans. The charge on the capacitor appears on the control grid of triode 29. The cathode output from this triode follows the grid input and if it rises above a predetermined threshold level within the two scans it turns trigger 39 "on." At the end of the two scans a negative read and reset pulse is provided from the single-shot multivibrator 37. This pulse is used to sample the condition of trigger 39 in "and" circuit 38. At the same time, this negative pulse cuts triode 35 off so as to discharge capacitor 31 through diode 33 and resistor 34. The negative pulse is also used to reset trigger 39. Since it takes a brief interval for the negative pulse to reset the trigger, i.e., capacity coupling is not used, there is sufficient time for the condition of trigger 39 to be sampled before reset.

From the above it will be apparent that the form of the invention shown in Fig. 1 consolidates data on an analog basis. The form of the invention shown in Fig. 2 performs the consolidation of data on a digital basis. Referring to Fig. 2, a master oscillator 50, which may be a conventional free-running multivibrator, serves as the source of pulses. From the right side of the master oscillator a series of negative pulses are fed to a conventional binary counter formed by triggers 52, 54, 56, 58 and 60. These triggers may be of the Eccles-Jordan type. The arrangement is such that trigger 52 receives the negative pulses from the master oscillator and divides the pulse frequency in half. Triggers 54, 56, 58 and 60 have their control grids connected to receive the plate output from the right sides of triggers 52, 54, 56 and 58, respectively. The plate output of the right side of trigger 60 is connected to a conventional frequency divider 62 which provides one negative pulse for every eight negative pulses it receives from trigger 60. This frequency divider may be in the form of three additional triggers. Thus, it will be seen that if the frequency of master oscillator 50 is denoted as $f$, the frequency output of triggers 52, 54, 56, 58 and 60 will be $f/2$, $f/4$, $f/8$, $f/16$ and $f/32$, respectively. Since the frequency divider 62 provides one output pulse for every eight input pulses thereto, its frequency will be $f/256$. These frequencies will be more apparent when considered in conjunction with the waveforms shown in Fig. 3. Each waveform is identified by the component from which it is obtained. For example, the waveform shown at A is from the right side of master oscillator 50 and is indicated by M.O. 50 (R). The letter (L) is used to indicate that an output is from the left side of a component. If neither (R) nor (L) is used, then it is the only output.

In order to obtain signals for providing the sawtooth voltages for the flying spot scanner deflection plates, the plate output from the left side of trigger 56 is fed to a conventional sawtooth generator which is identified as fast sweep generator 64. The output potentials from generator 64 are connected to the horizontal deflection plates 66 and 67. The output from the right side of generator 64 is illustrated at G in Fig. 3. The output from the left side of frequency divider 62 is connected to a sawtooth generator illustrated as a slow sweep generator 68. The output from this generator is connected to vertical deflection plates 69 and 70. It will be seen that one sawtooth wave is provided from generator 68 for every thirty-two sawtooth waves from generator 64. Scanning of the character, however, will be identical with that explained with respect to Fig. 1 with the Fig. 2 horizontal and vertical deflection plates replacing those shown in Fig. 1 in cathode ray tube 7. The reflected light from the area covered by the scanning spot is picked up by photomultiplier 72 and output signals are fed to video amplifier 74, which may be of a suitable conventional design. The amplified signals are fed through a clipping circuit 76, a pulse amplifier 75 and a cathode follower 77, to positive "and" circuits 78 and 80. Circuits 76, 75 and 77 may be identical with circuits 23, 24 and 25, respectively.

It is now desired to sample the video data which appears in positive "and" circuits 78 and 80 as positive pulses. This is accomplished by taking the plate outputs from the left and right sides of trigger 54 and supplying them through inverters 82 and 84, respectively, to "and" circuits 78 and 80, respectively. The negative going edge of the output from inverter 82 is also connected to the grid of the left side of trigger 88 to turn the trigger "off" while the negative going edge of the output from inverter 84 is connected to the grid of the right side of trigger 86 to turn the trigger "on." The positive output pulses from "and" circuit 78 are connected to the grid of the left side of trigger 86 and the negative edges of the pulses are used to turn the trigger "off." The positive output pulses from "and" circuit 80 are connected to the grid of the right side of trigger 88 and the negative edges of the pulses are used to turn the trigger "on." The plate outputs from the right side of trigger 86 and from the left side of trigger 88 are connected to a negative "or" circuit 90. The negative "or" circuit is of such a nature that it will pass all negative pulses which are fed to it as an output.

The negative pulses from "or" circuit 90 are connected to the input side of two counters each of which serves as an accumulating means. The first counter comprises triggers 92 and 94 suitably connected so that a threshold is reached when the fourth negative pulse is applied to trigger 92 and a negative pulse is furnished from the plate of the right side of trigger 96 to cause the trigger to turn "off." Thus, trigger 96 is a threshold responsive device. The last-named trigger is normally "on," i.e., with its left side conducting. It does not matter if more than four negative pulses are received by this first counter during two complete scans since any pulses after the fourth pulse cannot change the condition of trigger 96 until it has been reset along with triggers 92 and 94 at the end of the second complete scan.

The second counter also serves as an accumulating means and is comprised of triggers 98, 100 and 102 which are suitably connected such that after eight pulses are received from "or" circuit 90 a threshold is reached such that a negative pulse is supplied to the grid of the left side of trigger 104 so as to turn the trigger "off." Thus, trigger 104 is a threshold responsive device. This trigger is normally "on," i.e., with its left side conducting. The second counter is used to consolidate on the basis of four scans. In this counter it does not matter if more than eight pulses occur during the four scan interval as all over eight will not affect trigger 104 which is reset at the end of four complete scans.

In order to obtain the read and reset signals for interrogating the condition of the first and second counters, the output pulses from the left and right sides of master oscillator 50 to inverters 106 and 108, respectively, are used. The output pulses from inverter 108 are connected to the grid of the left side of trigger 110 while the output pulses of trigger 58 are connected to the grid of the right side of trigger 110. The output waveform from the plate of the left side of trigger 110 is shown at P in Fig. 3. This output is connected to inverter 111 which supplies a positive sampling pulse to positive "and" circuit 113. Since the plate of the left side of trigger 96 is also connected to said positive "and" circuit 113, it is possible to read the condition of the trigger. It will be noted that the sampling pulse is supplied at the end of the second complete scan. Thus, if after two complete scans trigger 96 has been turned "off," a positive pulse is obtained from "and" circuit 113 at sampling time. This indicates that the entire area covered by the two scans will be considered as black, i.e., as a part of the character. However, if trigger 96 has not been turned "off," the entire area will be considered to be white, i.e., as a part of the background.

The read pulse takes up the first half of the master oscillator cycle which begins at the end of two complete scans. A reset pulse takes up the second half. This reset pulse is produced by connecting the output from inverter 106 to the left side of trigger 112. The right side of trigger 112 is connected to receive the plate output of the right side of trigger 110. Referring to waveforms A, Q and R shown in Fig. 3, it will be seen that the negative going edge of the plate output of the right side of trigger 110 turns trigger 112 "on" so as to produce a positive going potential from trigger 112. One-half master oscillator cycle later the negative going edge of the output from inverter 106 turns trigger 112 "off" so that a negative going potential is provided from trigger 112. Thus, a positive reset pulse is produced which is one-half master oscillator cycle in duration and it occurs immediately after the read pulse. This reset positive is connected to inverter 114 so as to produce a negative pulse to the cathodes of diodes 116, 118 and 120. The plates of diodes 116 and 118 are connected to the plates of the right sides of triggers 92 and 94 while the plate of diode 120 is connected to the plate of the left side of trigger 96. The negative pulse from inverter 114, by plate reset action, turns triggers 92 and 94 "off" and trigger 96 "on," thus preparing this circuit for receiving pulses from "or" circuit 90.

It has now been described how data consolidation is obtained on the basis of two scans. The second counter, which feeds a negative pulse to turn trigger 104 "off" after it has counted to eight, is used to consolidate on the basis of four scans. The plate output of the left side of trigger 104 is connected to positive "and" circuit 128. Thus, after trigger 104 is turned "off" a positive pulse is fed to this "and" circuit. The positive sampling pulse from inverter 111 which was connected to "and" circuit 113 is also connected to "and" circuit 128. To obtain a positive pulse which occurs immediately upon the completion of the fourth scan, the negative output of trigger 60 is connected through inverter 126 to "and" circuit 128. It will be seen that the sampling pulse from inverter 111 can only pass through "and" circuit 128 after inverter 126 has provided the afore-mentioned positive pulse and when trigger 104 is "off." A positive pulse output from "and" circuit 128 indicates that the area which has been covered by the four scans will be considered as a part of the character. If trigger 104 was not turned off during the four scans, then no output will be provided from "and" circuit 128 and the area covered by the four scans is considered to be background.

The read pulse occurs during the first half of the first master oscillator cycle following the completion of the fourth scan. A reset is provided during the second half of the cycle by connecting the outputs from inverter 114 and trigger 60 to inverters 122 and 124, respectively. The two last inverters share the same plate load. Referring to waveforms F and S in Fig. 3 it will be seen that when inverter 114 has a negative output in coincidence with a negative output from trigger 60, a positive pulse is furnished from the plates of inverters 122 and 124, as shown in waveform T. When only one of inverters 122 and 124 is cut off no substantial change in output occurs at the plates thereof. However, when both inverters are cut off a positive pulse is provided. This positive pulse is connected to inverter 130. The output from this inverter therefore is a negative pulse which connects through diodes 132, 134, 136 and 138 to reset triggers 98, 100, 102 and 104, respectively. Plate reset is used and triggers 98, 100 and 102 are reset "off" while trigger 104 is reset "on."

The detailed operation of the form of the invention shown in Fig. 2 will be discussed in conjunction with the waveforms shown in Fig. 3. Master oscillator 50 serves as a source of pulses for timing purposes as shown by waveform A. A binary counter including triggers 52, 54, 56, 58 and 60, and frequency divider 62 is arranged to receive the negative pulses from the master oscillator and supply triggering pulses to fast sweep generator 64 and slow sweep generator 68. Waveforms B, C, D, E, F and G show the operation of these devices. These generators cause the flying spot scanner to generate a pattern past which the characters to be identified are moved, as shown in Fig. 1. The video data picked up by the photomultiplier 72 is amplified, clipped at upper and lower clipping levels and supplied as positive pulses to "and" circuits 78 and 80. These inputs to the "and" circuits, shown by way of example in waveform H, are sampled alternately by pulses obtained from the left and right sides of trigger 54 which are inverted in inverters 82 and 84, respectively, and supplied to the "and" circuits 78 and 80, respectively. The waveforms from inverters 82 and 84 are shown at I and J, respectively. The output pulses from "and" circuits 78 and 80, as respectively shown by waveforms K and L, are connected to the left side of trigger 86 and the right side of trigger 88, respectively, so that the negative going edges of these pulses turn the triggers "off" and "on," respectively. Trigger 86, having been turned "on" during one sampling period is not turned "off" until data is received from "and" circuit 78, and then not until the negative going trailing edge occurs. When trigger 86 is turned "off" a negative pulse is fed to "or" circuit 90. Trigger 88, having been turned "off" during one sampling period, is not turned "on" until data is received from "and" circuit 80, and then not until the negative going trailing edge occurs. When trigger 88 is turned "on" a negative pulse is fed to "or" circuit 90. It will be seen that each trigger can only be operated once at the most during one complete scan. The waveforms for the outputs from triggers 86 and 88 for the data from "and" circuits 78 and 80, respectively, are shown at M and N, respectively. The output waveform from "or" circuit 90, which passes all negative pulses supplied to it, is shown at O.

The negative pulses which pass through "or" circuit 90 are supplied to a first binary counter comprising triggers 92 and 94 and a second binary counter comprising triggers 98, 100 and 102. The first counter, after counting to four, turns trigger 96 "off," and the second counter, after counting to eight, turns trigger 104 "off." It should be appreciated that each of the first and second counters must count to four and eight, respectively, within two and four complete scans, respectively. If either does not reach its respective count during its respective number of scans, the output trigger associated therewith is not turned "off."

The output from the left plates of triggers 96 and 104 are connected to "and" circuits 113 and 128, respectively. In order to read the condition of these "and" circuits, sampling or read pulses are provided. The sampling pulse for "and" circuit 113 is obtained in the following manner. The output pulses from the right side of master oscillator 50 are inverted in inverter 108 and supplied to trigger 110. The right side of this trigger receives the output from trigger 58. At the end of two complete scans, the output of trigger 58 turns trigger 110 "on" and one-half master oscillator cycle later the output of inverter 108 turns trigger 110 "off." This produces a negative pulse during said one-half cycle from the left side of trigger 110 as shown at P in Fig. 3. This negative pulse is inverted in inverter 111 and connected to "and" circuits 113 and 128. If there is a positive potential from trigger 96 to "and" circuit 113 during the time the sampling pulse is supplied thereto, a positive output pulse is obtained from "and" circuit 113, thus indicating that the area covered by the two scans is to be considered black, i.e., as a part of the character. Reset of the first counter is obtained immediately after the sampling pulse by supplying the plate output from the right side of trigger 110 to the right grid of trigger 112, turning the latter trigger "on" by the trailing edge of the positive pulse received. One-half master oscillator cycle later the output from inverter 106, which is connected to the left grid of trigger 112, turns trigger 112 "off." This results in a positive pulse from the right plate of trigger 112, as shown at R in Fig. 3. This pulse is inverted in inverter 114 to provide a negative pulse, as shown at S in Fig. 3, which is used as the plate reset for triggers 92, 94 and 96 so as to return these triggers to their respective normal conditions. Thereafter they are receptive to pulses from "or" circuit 90.

The sampling pulse for "and" circuit 128 is obtained in the following manner. Trigger 60 provides a negative pulse at the completion of each fourth scan. This negative pulse is inverted in inverter 126 and fed to "and" circuit 128. At the same time a positive sampling pulse is furnished from inverter 111, as shown at Q in Fig. 3, to "and" circuit 128. If trigger 104 has been turned off during the preceding four scans, a positive pulse will be furnished from "and" circuit 128 in coincidence with the sampling pulse from inverter 111. This indicates that the area covered by the scanning spot during the preceding four scans is to be considered black, i.e., as a portion of the character. Inverters 122 and 124 have a common plate load and normally each is conducting. When a negative pulse is supplied to inverter 122 from inverter 114 after two complete scans, this is not enough to cause the plates of the inverters to drop. However, when this pulse is again supplied after four complete scans, inverter 124 has been fed a negative pulse from trigger 60. This causes a positive output pulse from inverters 122 and 124 as shown at T in Fig. 3. This pulse is inverted in inverter 130 and used to reset triggers 98, 100, 102 and 104 to their normal condition. Thus, the second counter is ready to receive negative pulses from "or" circuit 90.

While it is considered that all of the circuits shown in block or schematic form in Figs. 1 and 2 are conventional and well known to persons skilled in the art to which the present invention pertains, reference will be made to various circuits which are representative of the type of circuits which may be used. A large number of these representative circuits may be found in the publication Radar Electronics Fundamentals, Navships 900,016, published by the Navy Department, Bureau of Ships, in June 1944. It has already been stated that the master oscillators may be in the form of free-running multivibrators. Reference may be made to pages 202–205 of this publication. Fig. 219 shows the basic multivibrator circuit and Figs. 220 and 221 are shown to explain the action thereof. The output pulses are obtained from the plates of the right and left triodes. The triggers illustrated as having two inputs to the same side, such as the triggers 52 and 54 may be identical with the Eccles-Jordan trigger shown in Fig. 210 and explained on pages 192–194 of the afore-mentioned publication. In applicant's triggers the output from the right side of one trigger is shown to be connected to the next trigger with two inputs. This indicates that the input is connected to both grids of the trigger. Insofar as the triggers having an input to each side are concerned, i.e., such as trigger 110, the basic Eccles-Jordan trigger need only be provided with a separate terminal to each grid in lieu of the single terminal connected to both grids as shown in said Fig. 210. Then the input to the left side is connected through a capacitor to the control grid of the left triode while the input to the right side is connected through a capacitor to the control grid of the right triode. The outputs of all triggers may be taken from the plates of the right and left triodes. Those triggers requiring resetting, i.e., such as trigger 96 and 98, are reset by applying a negative pulse to the appropriate plate of the triode which is to be set to a conducting condition. A single-shot or one-shot multivibrator is shown in Fig. 211 and explained on pages 194–198 of said publication.

Reference is now made to Fig. 4 which shows the details of trigger 39. This trigger includes left and right triodes 140 and 142, respectively, the cathodes of these triodes being connected to a positive D.C. potential, herein illustrated as +25 v. D.C. The plate of each triode is connected through a suitable resistor to a positive source of D.C. potential. The plate of triode 142 is coupled to one end of a voltage divider including resistors 144 and 146, the other end of said voltage divider being connected to a negative source of D.C. potential. A capacitor 148 is connected in shunt with resistor 144. The midpoint of the voltage divider, i.e., between resistors 144 and 146 is connected through a resistor 150 to the control grid of triode 140. The plate of triode 140 is coupled to one end of a voltage divider including resistors 152 and 154, the other end of the last-named voltage divider being connected to a negative source of D.C. potential. A capacitor 156 is connected in shunt with resistor 152. A point between resistors 152 and 154 is connected through a resistor 158 to the control grid of triode 142. The arrangement is such that when triode 142 is conducting its plate is holding the grid of triode 140 down so that triode 140 is cut off. On the other hand, when triode 140 is conducting, its plate is holding the grid of triode 142 down so that triode 142 is cut off. This trigger is in a normal "off" condition when triode 142 is conducting. The input to the trigger comes from the cathode of triode 29 through a resistor 160 to the midpoint between resistors 144 and 146. When the potential on said cathode has risen sufficiently high it has charged capacitor 161 sufficiently to raise the grid of triode 140 to the point where conduction begins. The plate of triode 140 drops and in so doing drops the grid of triode 142 as in normal trigger action. This causes the plate of triode 142 to increase the grid potential of triode 140 until triode 140 is fully conducting and triode 142 is cut off. Thus, the trigger is "on" and a negative going potential is fed from the plate of triode 140 as an input to "and" circuit 38. At read time when the negative pulse from single-shot multivibrator 37 is applied to "and" circuit 38, a readout negative pulse is provided as the output from the "and" circuit. At the same time the negative pulse from single-shot multivibrator 37 is coupled through resistor 162 to the midpoint of resistors 144 and 146. The negative pulse does not immediately drop the grid of triode 140 due to capacitor 161. However, within a short time capacitor 161 is charged sufficiently negative to drop the grid of triode 140 and turn the trigger "off." Thus, the trigger is returned to its normal condition.

The negative "and" circuit 38 is shown in Fig. 5. The outputs from single-shot multivibrator 37 and trigger 39 are connected to the plates of diodes 164 and 166, respectively, the cathodes of both diodes being commoned and connected to a negative D.C. potential through a resistor 168. As long as the input to either diode is positive, current will flow therethrough and hold the cathodes at a potential above the negative source potential. However, when the input to both diodes is negative, neither diode conducts and the cathodes have a potential near that of the negative source, thereby providing a negative output signal.

A representative positive "and" circuit arranged to provide a positive output pulse upon the receipt of a coincidence of a plurality of positive pulses is shown in Fig. 6. This circuit is illustrated as "and" circuit 78 but it will be understood that "and" circuit 80 is similar thereto except that its inputs are received from different sources and the output is fed to a different trigger. As shown, the inputs from inverter 82 and clipping circuit 76 are connected to the cathodes of diodes 170 and 172, respectively, the plates of said diodes being connected to a positive source of D.C. potential through a resistor 174. The operation is such that if either input to the diodes is negative with respect to the positive source, current flows through the diode having this input and the plates of both diodes are held down. As soon as the inputs of both diodes are above the source potential, the voltage at the plates rises to a value near that of the source potential and thus provides a positive output signal to trigger 86. It is the trailing edge of this positive signal, i.e., when coincidence ends, that turns trigger 86 "off." It should be pointed out that positive "and" circuits 113 and 128 are similar to the circuit shown in Fig. 6 except that an additional diode is provided in circuit 128 and connected in the circuit just as diodes 170 and 172 are connected.

The negative "or" circuit 90 which passes negative pulses is shown in Fig. 7. The inputs from triggers 86 and 88 are coupled through capacitors 176 and 178, respectively, to the cathodes of diodes 180 and 182, respectively, the plates of said diodes being connected through resistor 184 to a positive D.C. source of potential. The arrangement is such that if the input to either capacitor drops below the positive D.C. source, the capacitor charges as the diode associated therewith begins conducting, thus providing a drop at the plates of the diodes and thus a negative output pulse to triggers 92 and 93. The capacitors 176 and 178 are used to assure that the output from the circuit appears in the form of pulses.

The clipping circuits 23 and 76 may be similar to the circuit shown in Fig. 8. The amplified video signals are connected through a resistor 186 to the plate and cathode of diodes 188 and 190, respectively. The cathode of diode 188 is connected to a source of potential E1 while the plate of diode 190 is connected to a source of potential E2. The arrangement is such that diode 190 conducts until the signal input reaches the level of E2. Neither diode conducts thereafter until the input signal reaches the level of E1. When the input signal rises above E1 diode 188 conducts. Therefore, the output signal has an amplitude which is equal to E1−E2. The output signal begins at level E2 and rises to level E1.

The variable source of D.C. potential 32 which was illustrated as a variable battery in Fig. 1 may be in the form shown in Fig. 9. This includes a battery 192 having a potentiometer 194 connecting the high and low sides thereof. Capacitors 196 and 198 are connected between the variable tap and the high and low sides respectively of said battery. The capacitors are used to prevent the periodic discharge of capacitor 31 from affecting a particular source level.

Insofar as the use of inverters 122 and 124 with a common plate resistor is concerned, reference is made to Fig. 10 which shows triodes 202 and 204 having their grids arranged to receive the outputs from inverter 114 and trigger 60, respectively. The cathode of the triodes are commoned and connected to a negative source B− while the plates are commoned and connected through a resistor 207 to a B+ source of potential. The triodes are normally conducting so that the plates are normally held down. A negative pulse to only one of the grids will not permit the commoned plates to rise substantially. However, if both grids receive a negative pulse, both triodes are cut off and a positive output pulse is fed from the plate to inverter 130.

The present invention provides a data handling circuit for consolidating data received from scanning apparatus. The consolidation of this data permits the scanning apparatus to look very closely at the characters to be identified. Yet the final data output which is adapted to be fed to a conventional recognition circuit does not contain all of the detailed data picked up by the scanning apparatus since the data has been consolidated. The consolidation circuit takes the data obtained over a predetermined number of scans and determines whether the area covered by these scans should be considered as a part of the character or a part of the background. The present invention is particularly useful in obtaining reliable data relative to characters having weak lines. In standard character recognition systems using large scanning spots, the clipping level must be set sufficiently high to prevent picking up the data in the noise region of the signal. Thus, weak lines are lost.

It will be seen that other forms of scanners and timing circuits could be utilized in the present invention. For example, scanning discs could be used. The pulse generator could be in the form of a disc having a magnetized sync track thereon, this disc being rotated in synchronism with the scanning disc. In the circuit shown in Fig. 1, it is a simple matter to vary the number of scans which are to be considered by taking the read and reset pulse from a different point in the timing circuit. The criteria which is to be used in determining if the area scanned is to be considered a part of the character or a part of the background may be varied by varying the level of the potential source 32. While the circuit of Fig. 2 shows circuits for consolidating the data over either a two scan or a four scan period, it will be seen that other scan periods could be used. Also, the criteria for considering the area scanned, a part of the character or a part of the background may be varied by varying the number of stages in the counters used to receive the negative pulses from "or" circuit 90.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data handling circuit in combination with character scanning apparatus comprising means for scanning a character in a plurality of sweeps which advance successively across said character, means including detector means responsive to the sensing of portions of said character by the scanning means for producing output signals, accumulator means connected to the second-mentioned means for accumulating said output signals, means controlled by said scanning means for periodically resetting said accumulator means after a predetermined number of sweeps, and means connected to said accumulator means which is responsive to the reaching of a predetermined count of said output signals within said accumulator means for indicating whether the area covered by said scanning means during said predetermined number of sweeps is to be considered a part of the character or a part of the background surrounding said character.

2. A data handling circuit in combination with character scanning apparatus comprising means for scanning a character in a plurality of sweeps which advance successively across the character, means including detector means responsive to the sensing of portions of said character by the scanning means for producing output signals, accumulator means connected to the second-mentioned means for accumulating said output signals, means synchronized by said scanning means for periodically producing a reset signal after a predetermined number of sweeps, said accumulator means being connected to receive said reset signal and to be reset thereby, and means connected to said accumulator means for indicating whether a predetermined count of said output signals is reached in said accumulator means during said predetermined number of sweeps.

3. A data handling circuit in combination with character scanning apparatus comprising means for scanning a character in a plurality of successive scans which advance one after the other across the character, means including detector means responsive to the sensing of portions of said character by the scanning means for producing output signals, accumulator means connected to received and accumulate said output signals, means for periodically generating a read signal after a predetermined number of scans, and means connected to said accumulator means and responsive to said read signal for indicating when a predetermined count of said output signals is reached in said accumulator means during said predetermined number of scans.

4. A data handling circuit in combination with character scanning apparatus comprising means for scanning a character with a scanning beam in a plurality of successive sweeps which advance one after the other across the character, means including detector means responsive to the sensing of portions of said character by said scanning beam for producing signals, accumulator means connected in a manner to receive said signals, and a threshold responsive device connected to said accumulator means, said threshold responsive device being operative to produce an output signal when said accumulator means has received signals for a predetermined percentage of a predetermined time interval of scanning beam movement.

5. A data handling circuit in combination with character scanning apparatus comprising means for scanning a character with a scanning beam in a plurality of successive sweeps which advance one after the other across the character, means including detector means responsive to the sensing of portions of said character by said scanning beam for producing signals, accumulator means connected to the second-mentioned means for receiving said signals and accumulating them over a predetermined number of sweeps, said accumulator means having a pick-off point therein from which an output signal is produced when a predetermined count of said signals is reached in said accumulator means, means connected to and controlled by the scanning means for producing read and reset signals which occur once for each predetermined number of sweeps, means connected to receive said output signal and said read signal for producing a character bit signal indicative of the fact that the area covered by the scanning beam during the predetermined number of sweeps when the output signal was produced is to be considered a part of the character being scanned, and means connected to said accumulator means and responsive to said reset signal for resetting said accumulator means.

6. Apparatus of the class described comprising means for scanning a character with a scanning beam in a plurality of successive sweeps which advance across the character one after the other, each of said sweeps being shorter than the width of the character, means including detector means responsive to the sensing of portions of said character by said scanning beam for producing signals, accumulator means connected in a manner to receive said signals and including a capacitor which is arranged to be charged by said signals, a threshold responsive device connected to said accumulator means, said threshold responsive device having a first condition when the charge on said capacitor is below a predetermined threshold level and a second condition when the charge on said capacitor is above a predetermined threshold level, circuit means connected to said threshold responsive device, and means for periodically producing read and reset signals for each of a predetermined number of sweeps under the control of the scanning means, said circuit means and said accumulator means being connected to said circuit means, the read signal being utilized to read the condition of said threshold responsive device through said circuit means, and the reset signal being utilized to reset said capacitor and said threshold responsive device.

7. Apparatus of the class described comprising means for scanning a character with a scanning beam in a plurality of successive sweeps which advance across the character one after the other, each of said sweeps being shorter than the width of the character, means including detector means for producing signals in response to the sensing of portions of said character by said scanning beam, data consolidation means connected to the second-mentioned means and including a capacitor which is arranged to have the potential thereacross varied by said signals, a threshold responsive device connected to said data consolidation means, said threshold responsive device having a normal condition when the potential across said capacitor is on one side of a predetermined level and an abnormal condition when the potential across said capacitor is on the other side of said predetermined level, output circuit means connected to said threshold responsive device, and means operative after a predetermined number of scans for reading the condition of said threshold responsive device, for resetting said capacitor to a starting condition and for returning said threshold responsive device to said normal condition if it has been set to an abnormal condition.

8. Apparatus of the class disclosed comprising means for scanning a character in a plurality of successive sweeps which advance one after the other across the character, each of said sweeps being shorter than the width of said character, means including detector means for producing video signals during the intervals when the scanning means senses portions of the character, means for supplying sampling pulses, there being a predetermined number of said sampling pulses for each sweep, means including coincidence circuit means arranged to receive said sampling pulses and said video signals for producing a single output signal during each sampling interval that there is at least one video signal, accumulator means arranged to receive the single output signals and to accumulate them over a predetermined number of sweeps, a threshold responsive device connected to said accumulator means for producing a character signal if a predetermined threshold is reached in said accumulator means, means for supplying read and reset signals for each predetermined number of sweeps, and an output circuit means connected to said threshold responsive device and arranged to receive said read signal and provide an output signal if a character signal has been supplied by said threshold device during said predetermined number of sweeps immediately preceding said read signal, said reset signal being received by said accumulator means and said threshold responsive device for placing them in their original condition.

9. Apparatus of the class described comprising means for scanning a character with a scanning beam in a plurality of successive sweeps which advance across the character, means including detector means responsive to the sensing of portions of said character by the scanning beam for producing video signals, means for sampling said video signals at predetermined intervals and producing an output signal for each sampling interval during which there is at least one video signal, accumulator means arranged to receive the output signals and to count them until a predetermined count is reached, means responsive to the reaching of said predetermined count for producing a character signal, and means for periodically resetting said accumulator means after a predetermined number of sweeps.

References Cited in the file of this patent

UNITED STATES PATENTS

| | | |
|---|---|---|
| 2,616,983 | Zworykin | Nov. 4, 1952 |
| 2,624,798 | Dinga | June 6, 1953 |
| 2,663,758 | Shepard | Dec. 22, 1953 |
| 2,681,381 | Loe | June 15, 1954 |

OTHER REFERENCES

"Photoelectric Reader" by David H. Shepard and Clyde G. Heasby, Jr., "Electronics," May 1955, pages 134–138.